United States Patent
Cummins et al.

[11] Patent Number: 5,858,438
[45] Date of Patent: Jan. 12, 1999

[54] DOUGH CUT-OFF AND POSITIONING METHOD AND APPARATUS

[75] Inventors: Chris M. Cummins, Mechanicsville; Sam Seiling, Richmond, both of Va.

[73] Assignee: Cummins Eagle, Inc., Ashland, Va.

[21] Appl. No.: 966,413

[22] Filed: Nov. 7, 1997

[51] Int. Cl.⁶ ............... A21C 11/00; A21D 6/00; A23P 1/00
[52] U.S. Cl. ............ 426/503; 83/556; 425/308; 425/311; 426/516; 426/518
[58] Field of Search .................. 426/503, 516, 426/518; 425/308, 311, 317; 264/141, 142; 83/556, 584

[56] References Cited

U.S. PATENT DOCUMENTS

| | | | |
|---|---|---|---|
| 4,332,538 | 6/1982 | Campbell | 425/311 |
| 4,395,427 | 7/1983 | Fischer et al. | 426/503 |
| 4,424,236 | 1/1984 | Campbell | 426/503 |
| 4,449,908 | 5/1984 | Campbell | 425/204 |
| 4,517,212 | 5/1985 | Campbell | 426/503 |
| 4,948,611 | 8/1990 | Cummins | 426/503 |
| 4,960,601 | 10/1990 | Cummins | 426/504 |
| 5,046,940 | 9/1991 | Cummings | 425/311 |
| 5,443,854 | 8/1995 | Cummins | 426/503 |
| 5,591,472 | 1/1997 | Cummins | 426/503 |

*Primary Examiner*—George Yeung
*Attorney, Agent, or Firm*—Norman B. Rainer

[57] ABSTRACT

An apparatus for cutting a continuous dough extrudate into pieces of uniform weight and accurately positioning the pieces on a moving belt includes a knife blade having a flat upper surface bounded in part by two opposed cutting edges, and a bottom surface having a double taper formed by flat facets downwardly angled from the cutting edges and meeting in an apex. An elongated dough positioning guide is downwardly directed from the bottom surface. The knife blade is caused to undergo reciprocating motion at a frequency dependent upon the velocity of the extrudate and the speed of the moving belt.

13 Claims, 2 Drawing Sheets

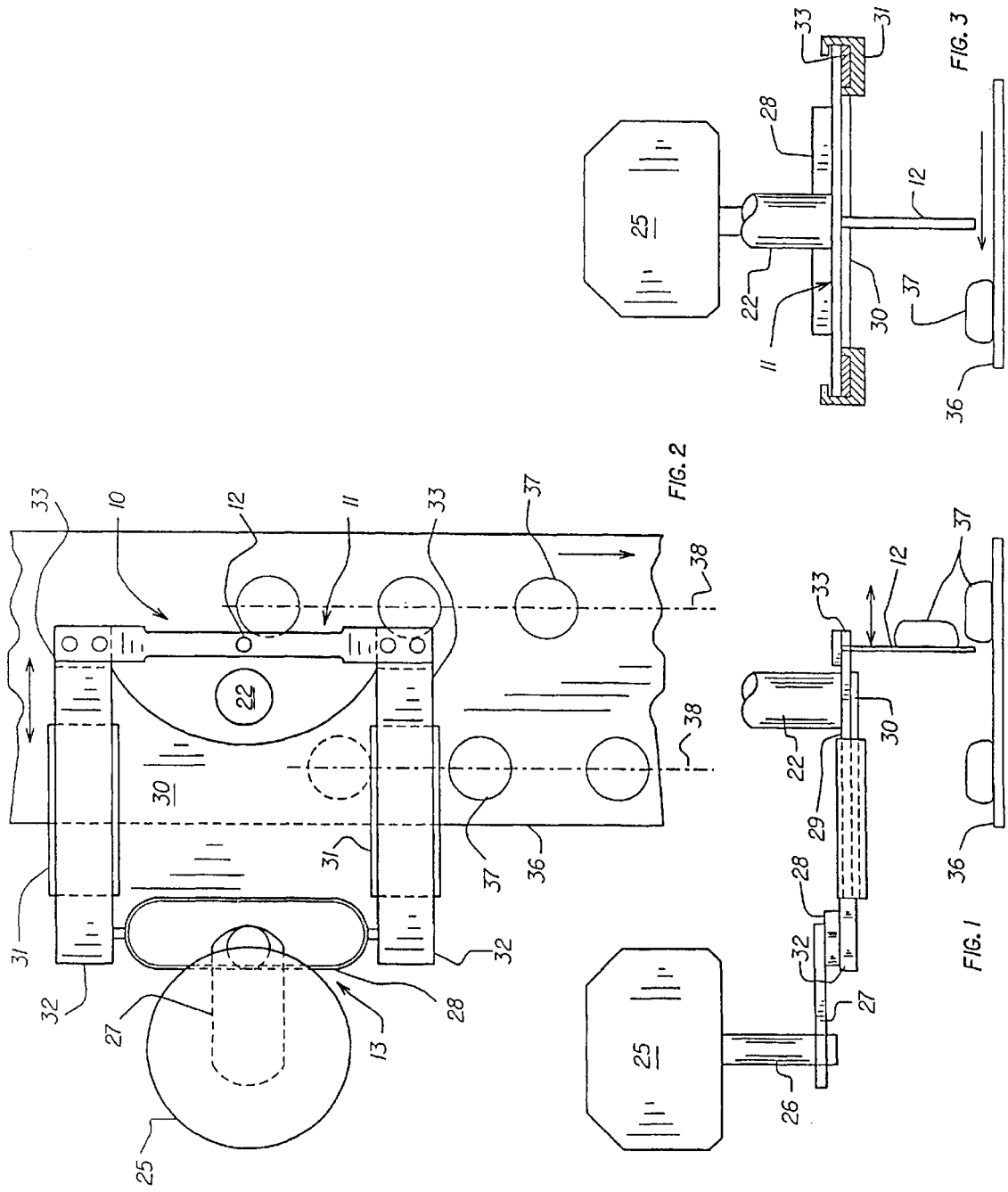

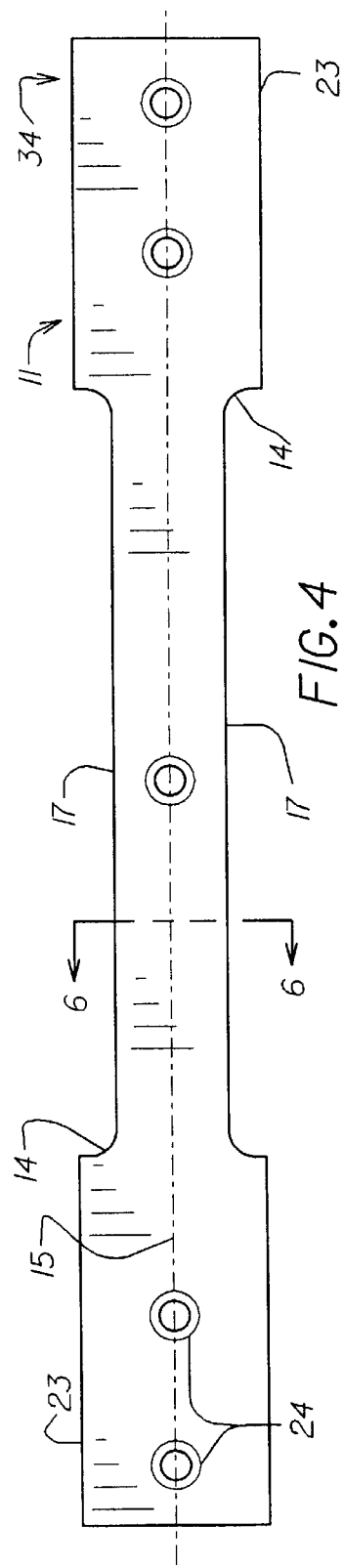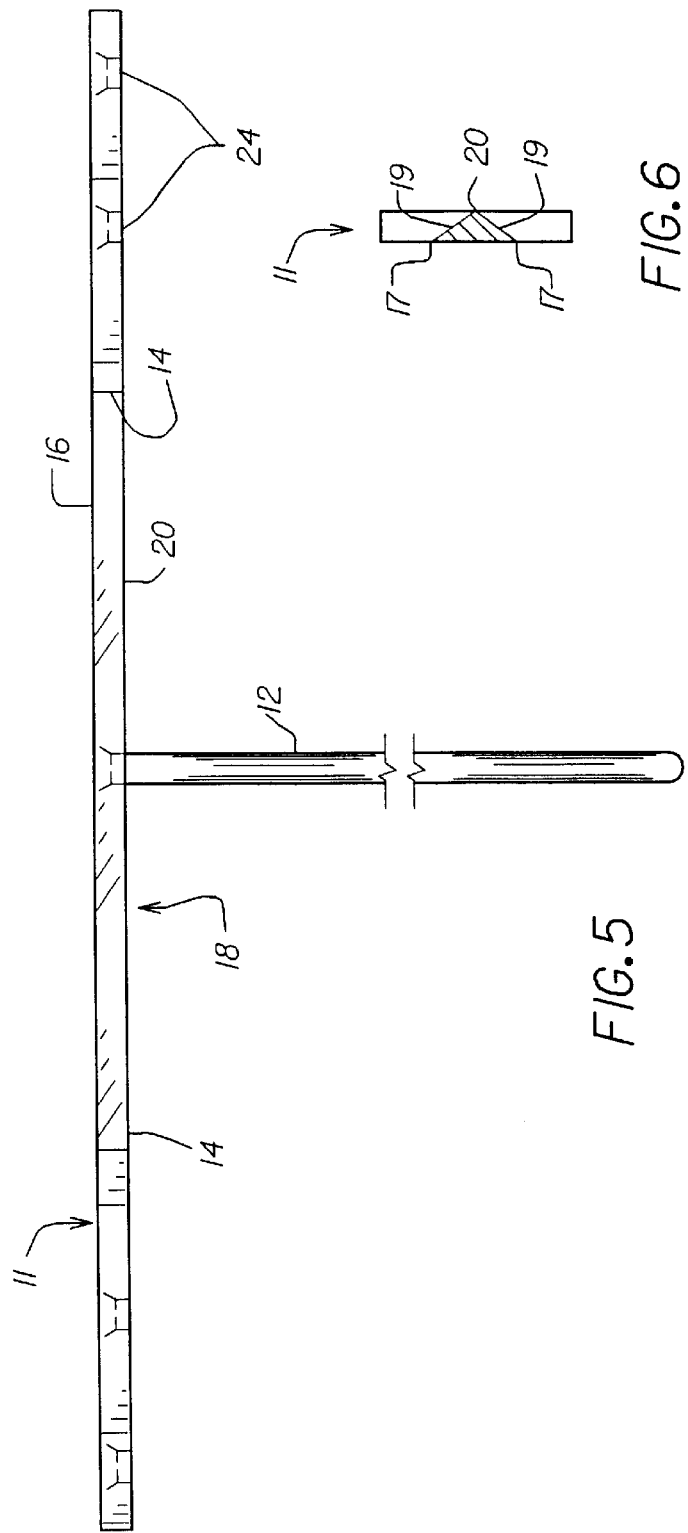

DOUGH CUT-OFF AND POSITIONING METHOD AND APPARATUS

BACKGROUND OF THE INVENTION

1. Field of the Invention

This invention relates to the handling of dough for baking, and more particularly concerns a method and apparatus for dispensing successive pieces of dough of constant weight.

2. Description of the Prior Art

Methods and apparatus for pumping, homogenizing and dividing dough into pieces of predetermined uniform weight for baking into bread loaves, buns, rolls and the like are disclosed in U.S. Pat. Nos. 4,960,601; 4,517,212; 4,449,908; 4,424,236; 4,332,538; 4,948,611; and 5,046,940. In general, such apparatus includes a hopper which receives dough, auger means for advancing the dough, multiple nozzles which receive the metered dough, and cutting means which sever the continuously advancing dough into discrete pieces that fall onto an underlying moving belt.

It is important that the successive dough pieces be of constant weight because bread, buns and rolls are sold on a weight basis. The uniformity of weight also produces products of uniform quality and facilitates the automated handling and packaging of the baked products. The weight of the dough is one of the most expensive cost elements in manufacturing baked goods, and control of the weight tolerances can reduce the need for excess dough. The production of dough pieces of a given weight is known as "scaling" in the trade. In general, less than 2% deviation in weight is sought relative to a target weight.

Modern dough processing equipment operates at high speeds wherein the linear rate of dough extruded through the nozzles may be as high as about 75 feet/minute. The rate of cutting of the stream of dough into discrete pieces may be in the range of 100 to 150 cuts/minute. Since the cutting means acts in a direction transverse to the direction of dough flow, it must move rapidly and with high precision. If the rate of movement of the cutting means is slow relative to the linear rate of movement of the extruded dough, the severed pieces of dough will be of improper shape, or may be fragmented. A problem often encountered at the site of cutting is the accumulation of dough which diminishes the accuracy of the cutting step.

For the purpose of achieving efficient utilization of subsequent equipment, it is desirable that multiple lines of dough pieces are formed on the moving belt. Multiple lines of dough pieces have generally been produced by the use of multiple nozzles arranged transversely across the moving belt. Such use of multiple nozzles is disclosed, for example, in U.S. Pat. Nos. 4,395,427, 4,948,611 and 5,046,940.

In order to maintain uniformity of weight and dough consistency amongst multiple lines of dough pieces emergent from a dough divider machine, it would be desirable to produce multiple lines from a single nozzle. Such arrangement would also enable the dough divider machine to be of simpler construction, and could further result in easier maintenance and cleaning of the machine. The production of multiple lines of dough pieces from a single nozzle is disclosed in FIG. 3 of U.S. Pat. No. 5,605,708, wherein a reciprocating pusher device laterally positions pieces of dough resting upon the belt. Although effective, the speed of operation of the pusher device is limited, presumably because of the time required for the non-productive retraction motion of the pusher in preparation for its next pushing motion.

The pushing of pieces of dough upon an underlying moving belt is also disclosed in U.S. Pat. No. 4,948,611 wherein a cut-off knife pushes newly formed dough pieces from multiple nozzles in the direction of belt movement, an action which serves merely to advance the dough piece away from the nozzles.

It is accordingly an object of the present invention to provide apparatus for producing from a single extrusion nozzle two lines of dough pieces upon an underlying moving belt.

It is another object of this invention to provide a method for producing from a single extrusion nozzle two lines of dough pieces upon an underlying moving belt.

It is a further object of the present invention to provide apparatus of the aforesaid nature which is of simple, durable construction amenable to low cost manufacture.

These objects and other objects and advantages of the invention will be apparent from the following description.

SUMMARY OF THE INVENTION

The above and other beneficial objects and advantages are accomplished in accordance with the present invention by a dough cutting and positioning apparatus for use in close adjacency to a nozzle from which a continuous stream of bakery dough is emergent, said apparatus comprising:

a) a knife blade elongated between two lateral extremities upon a center plane of symmetry and having a flat upper surface bounded in part by parallel straight cutting edges equally spaced from said plane of symmetry, and a bottom surface having a double taper by virtue of opposing flat facets downwardly angled from said cutting edges and meeting in an apex edge disposed within said plane of symmetry, b) elongated dough positioning means downwardly directed from said bottom surface at a site mid-way between said lateral extremities and centered upon said plane of symmetry, c) support means associated with said lateral extremities, and d) means for producing reciprocating movement of said blade in a manner causing said knife blade to traverse the entire diameter of said nozzle in close adjacency thereto.

The present invention further embraces a method for producing two lines of dough pieces on an underlying moving belt from a single dough-extruding nozzle, said method comprising:

a) positioning beneath said nozzle an assembly comprised of a knife blade having two opposed cutting edges and a doubly tapered bottom surface, and dough positioning means downwardly directed from said bottom surface, b) oscillating said assembly at a rate such as to cause alternating cutting edges of said knife blade to cut through the dough emergent from said nozzle, c) causing each resultant piece of dough to be contacted by and momentarily held by said dough positioning means, d) transporting the held piece of dough to different lateral sites above said moving belt, and e) dropping the held piece of dough onto the underlying moving belt in a manner to produce two straight lines of successive pieces of dough.

BRIEF DESCRIPTION OF THE DRAWING

For a fuller understanding of the nature and objects of the invention, reference should be had to the following detailed description taken in connection with the accompanying drawing forming a part of this specification and in which similar numerals of reference indicate corresponding parts in all the figures of the drawing:

FIG. 1 is a front view of an embodiment of the dough cutting and positioning apparatus of the present invention shown in operative association with a dough-conveying nozzle and underlying moving belt.

FIG. 2 is a top view of the apparatus of FIG. 1.

FIG. 3 is a side view of the apparatus of FIG. 1.

FIG. 4 is an enlarged top view of the blade component of the apparatus.

FIG. 5 is a side view of the blade of FIG. 4.

FIG. 6 is a sectional view taken in the direction of the arrows upon the line 6—6 of FIG. 4.

DESCRIPTION OF THE PREFERRED EMBODIMENT

Referring now to FIGS. 1–6, an embodiment 10 of the dough cutting and positioning apparatus of the present invention is shown comprised of knife blade 11, dough positioning means 12 pendently supported by said blade, and means 13 for producing reciprocating movement of said blade and attached dough positioning means in close adjacency to a dough extruding nozzle 22.

Knife blade 10, preferably fabricated of a metal such as stainless steel, is elongated between two lateral extremities 14 upon a center plane of symmetry 15. Said knife blade is further comprised of flat upper surface 16 bounded in part by opposed cutting edges 17 equally spaced from said plane of symmetry, and which are preferably straight and in parallel juxtaposition. Said knife blade has a bottom surface 18 having a double taper by virtue of opposing flat facets 19 downwardly angled from said cutting edges and meeting in an apex edge 20 disposed within said plane of symmetry. The angle of said facets with respect to upper surface 16 may range between 30 and 45 degrees. The width of blade 10, measured between cutting edges 17, is preferably between 0.5 and 0.75 inch. The thickness of blade 10, measured between upper surface 16 and apex edge 20, is preferably between 0.2 and 0.4 inch. The length of blade 10, measured between lateral extremities 14 is at least as large as the diameter of nozzle 22, and will typically range between about 3 and 5 inches. All surfaces of the knife blade are highly polished so as to prevent the clinging of dough.

Knife blade 10 is preferably fashioned from the center of a piece of metal bar stock 34 wherein the opposite ends 23 of the bar stock serve as support means for the knife blade. In particular, the ends 23 of the bar stock are provided with apertures 24 for securement to a moving mechanism, as will be shown.

Dough positioning means, in the form of polished rod 12 is attached to the bottom surface of knife blade 10, and downwardly directed therefrom. The site of said attachment is mid-way between lateral extremities 14, and centered upon said plane of symmetry. The diameter of rod 12 is preferably between 0.18 and 0.30 inch, and its length is preferably between 4 and 6 inches. Although dough positioning means of other configuration may be employed, it has been found that the exemplified straight cylindrical rod is eminently suitable because it successfully engages the freshly cut piece of dough, transports it, and releases it without producing clinging particles of dough.

The configuration of the dough positioning means, exemplified in the form of rod 12, is important. Within a time interval of less than about a second, the freshly cut piece of dough must be caused to cling to the dough positioning means, and subsequently released by gravity effect in a downward direction. The duration of time that the piece of dough spends clinging to the dough positioning means must be precisely equal to the duration of time required for the cutting assembly to traverse the distance between the center of nozzle 22 and line 38 of dough pieces on belt 36. When the piece of dough drops from the dough positioning means, it should remain integral, namely without having fragments torn therefrom.

Although suitable dough positioning means may have a configuration other than rod 12, the aforesaid performance criteria must be met, and it is to be noted that such criteria are also dependent upon the consistency of the dough being handled, and the size of the cut pieces of dough. In general, dough positioning means useful in the practice of the present invention may be characterized as having a) a smooth surface finish, b) no angular features, c) bilateral symmetry with respect to plane of symmetry 15, and d) a minimal surface area that contacts the dough, said minimal surface area preferably being arcuately convex with respect to the clinging piece of dough, and accordingly convex with respect to the cutting edges 17 of blade 10.

Means for producing reciprocating movement of said knife blade and attached dough positioning means is exemplified in the form of motorized assembly 13. Said assembly is comprised of electric motor 25 which may be attached to the framework of a dough divider machine that services nozzle 22. The output shaft 26 of said motor is equipped with a cam arm 27 which interacts with an elongated cam follower aperture 28 attached to the proximal extremities 32 of moveable guide means in the form of paired tracks 29. A plate 30, supported by said framework, secures stationary guide means in the form of paired tracks 31 which are slidably interactive with said movable tracks. The distal extremities 33 of said moveable tracks are bolted to the opposite ends 23 of bar stock 34. By virtue of such arrangement of components, revolution of output shaft 26 causes blade 10 to be moved back and forth in a linear path of motion closely adjacent the terminal extremity of nozzle 22, and rod 12 is aligned to traverse the diameter of the nozzle.

The linear speed of movement of blade 10 is maximum during the mid point of its traversing movement across the nozzle, and is minimal at the extremities of such reciprocating motion. Also, there is no stop and go effect which could produce excessive wear of the various components.

In the method of operating the apparatus of this invention, the frequency of traversal of blade 10 is adjusted to the rate of emergence of dough from nozzle 22 and the rate of linear movement of an underlying conveyor belt 36 such that successive pieces of dough 37 are cut by interaction with alternating edges 17 of blade 10, and the amplitude of the traversal motion is adjusted to place alternating pieces of dough in two separate lines 38 on the moving belt.

While particular examples of the present invention have been shown and described, it is apparent that changes and modifications may be made therein without departing from the invention in its broadest aspects. The aim of the appended claims, therefore is to cover all such changes and modifications as fall within the true spirit and scope of the invention.

Having thus described our invention, what is claimed is:

1. A dough cutting and positioning apparatus for use in close adjacency to a nozzle from which a continuous stream of bakery dough is emergent, said apparatus comprising:

a) a knife blade elongated between two lateral extremities upon a center plane of symmetry and having a flat upper surface bounded in part by two opposed cutting edges equally spaced from said plane of symmetry, and a bottom surface having a double taper by virtue of opposing flat facets downwardly angled from said cutting edges and meeting in an apex disposed within said plane of symmetry, b) elongated dough positioning means downwardly directed from said bottom surface at a site mid-way between said lateral extremities and centered upon said plane of symmetry, c) support means associated with said lateral extremities, and d) means for producing reciprocating movement of said blade in a manner causing said knife blade to traverse the entire diameter of said nozzle in close adjacency thereto.

2. The apparatus of claim 1 wherein said cutting edges are straight and parallel.

3. The apparatus of claim 2 wherein said apex is a straight edge.

4. The apparatus of claim 3 wherein the angle of said facets with respect to said upper surface is between 30 and 45 degrees.

5. The apparatus of claim 1 wherein said reciprocating movement is in a horizontal direction.

6. The apparatus of claim 1 wherein said dough positioning means has a smooth surface and bilateral symmetry with respect to said plane of symmetry.

7. The apparatus of claim 6 wherein said dough positioning means has a shape which is arcuate and convex with respect to said cutting edges.

8. The apparatus of claim 7 wherein said dough positioning means is a rigid rod.

9. The apparatus of claim 1 wherein said means for producing reciprocating movement is a motorized assembly comprised of:

a) an electric motor having an output shaft, b) a cam arm attached to said output shaft and interactive with an elongated cam follower, c) moveable guide means extending in attachment between said cam follower and said support means associated with said knife blade, and d) stationary guide means slidably interactive with said moveable guide means, whereby e) continuous rotation of said output shaft produces back and forth movement of said knife blade in a linear path.

10. A method for producing two lines of dough pieces on an underlying moving belt from a single dough-extruding nozzle, said method comprising:

a) positioning beneath said nozzle an assembly comprised of a knife blade having two opposed cutting edges and a doubly tapered bottom surface, and dough positioning means downwardly directed from said bottom surface, b) oscillating said assembly in traversing movement across said nozzle such as to cause alternating cutting edges of said knife blade to cut through the dough emergent from said nozzle, c) causing each resultant piece of dough to be contacted by and momentarily held by said dough positioning means, d) transporting the held piece of dough to different lateral sites above said moving belt, and e) dropping the held piece of dough onto the underlying moving belt in a manner to produce two straight lines of successive pieces of dough.

11. The method of claim 10 wherein said dough-extruding nozzle is downwardly directed.

12. The method of claim 10 wherein the linear speed of movement of said knife blade during its oscillation is maximum at a site corresponding to the mid point of traversal across said nozzle, and is minimal at the extremities of said oscillatory motion.

13. The method of claim 10 wherein the frequency of traversal of said knife blade is adjusted to the rate of emergence of dough from said nozzle and the rate of linear movement of said moving belt such that successive pieces of dough deposited upon said belt are aligned in two separate lines.

* * * * *